United States Patent [19]

Smith

[11] 4,339,188
[45] Jul. 13, 1982

[54] BRIGHT SCREEN OPTICAL VIEWER APPARATUS AND METHOD

[75] Inventor: Harry L. O. Smith, Cleveland, Tenn.

[73] Assignee: Beattie Systems, Inc., Cleveland, Tenn.

[21] Appl. No.: 246,668

[22] Filed: Mar. 23, 1981

[51] Int. Cl.$^3$ .......................... G03B 13/02; G03B 3/00
[52] U.S. Cl. .................................... 354/219; 354/200
[58] Field of Search ............... 354/152, 155, 150, 151, 354/161, 219, 200, 201, 276; 350/117

[56] References Cited

U.S. PATENT DOCUMENTS

| | | | |
|---|---|---|---|
| 1,682,139 | 8/1928 | Mitchell | 354/219 X |
| 1,733,511 | 10/1929 | Mueller | 354/201 |
| 2,173,553 | 9/1939 | Graf | 354/200 X |
| 3,149,547 | 9/1964 | Jurenz | 354/155 X |
| 3,182,576 | 5/1965 | Papke | 354/155 |
| 3,975,750 | 8/1976 | Yoshino et al. | 354/155 X |
| 4,047,207 | 9/1977 | Altman et al. | 354/152 X |
| 4,083,626 | 4/1978 | Miyahara et al. | 350/117 |

Primary Examiner—Donald A. Griffin
Attorney, Agent, or Firm—Alan Ruderman

[57] ABSTRACT

A twin lens reflex camera has a viewing system including a ground glass screen having the viewing surface coated with a thin layer of a clear optical grade epoxy and has the coated surface mounted behind and in contact with a Fresnel lens. A pair of magnifying lenses are positioned behind the ground glass screen in front of the viewing station. The coating is applied while in solution with solvents that thereafter evaporate. A final thickness of approximately 0.0001 inch is obtained by further processing. An improvement of received image brightness of approximately 8 to 25 fold uniformly over the image screen has been measured. The magnifying lenses are adjustably mounted within the interior of the viewer to improve eye relief. A flexible hood readily adjustable on the viewer housing cooperates with adjustable flaps secured to the viewer housing to provide good contrast to the image formed on the screen.

14 Claims, 7 Drawing Figures

BRIGHT SCREEN OPTICAL VIEWER APPARATUS AND METHOD

BACKGROUND OF THE INVENTION

This invention relates to image forming screens for optical equipment, and more particularly to a method and apparatus for increasing the brightness and quality of the image formed on such screens while providing uniform illumination over the image area.

Present professional long film roll cameras are of the twin lens reflex type having a ground glass image forming viewing screen positioned behind a viewing lens in the upper portion of the camera and a film image forming or taking lens in the lower portion of the camera. Typically, a 100 foot roll of film will produce from 500 to 1,800 frames per rolls, depending upon the negative size, since such cameras are used to photograph a multitude of photographs each day. Generally, in studio and similar posed photography environments the posing lighting may consist of 150 watts in a space of 15 feet by 15 feet with the camera placed from 6 to 20 feet from the subject. Furnishings under these conditions are usually dark and textured to minimize reflections. The photographer is thus composing by looking at an extremely dim image approximately 2 inches by $1+\frac{3}{4}$ inches on the viewing screen. In addition to this dim environment the photographer may have to photograph at other locations such as store windows, advertising displays, and similar environments where the bright back lights may introduce reflections in the viewer optics or expose his eyes to lighting contrasts.

The procedure of composing, focusing, and making technical and artistic judgements on some 500 to 700 subjects daily imposes a strain on the eyes and visual perception of the photographer. Inasmuch as the results of a days work may not be seen for two weeks, the economic losses due to any poorly focused photos can be significant.

Similar visual eye strain and loss of perception and acuity result in other optical systems in which there is a rear projection of an image upon a screen such as opaque projectors, micro film projectors, movie editor machines and consoles, microscope projectors and many other types of cameras and other back projection screen devices.

SUMMARY OF THE INVENTION

The present invention provides a method and apparatus for improving the brightness of the image forming screen of cameras and other optical systems projecting an image rearwardly upon a viewing screen while preserving a highly specular uniformity of illumination. The invention obtains an approximately 8 to 25 fold increase in image brightness by providing a ground glass image forming screen coated with a thin layer of a clear optical grade surface leveling material on the image forming surface, and mounting the screen in contact with a Fresnel lens rearwardly of the viewing lens. More specifically, the coating is an optically transparent epoxy resin applied to the ground glass in a thickness of approximately one ten thousandth of an inch (0.0001 inch), or as required by the particular combination of lens, ground glass quality and size, and of lens image on the ground glass with respect to acceptable "hot spot" control. With the grade of glass utilized the coating thickness ranges between 0.00005 inch to 0.0025 inch RMS. The coating is applied uniformly to a dry clean ground glass in a solution having the coating material as disolved solids forming approximately 10% of the solution with the remainder being readily evaporable solvent.

Another aspect of the invention is the provision of a large magnification factor lens system behind the ground glass Fresnel lens system for improved eye relief, the magnification lens system having adjustability to accommodate the photographer, the combination producing a brightly illuminated large image on a screen devoid of hot spots, and when used with a darkening hood provides maximum visible contrast and acuity.

It is therefor a primary object of the present invention to provide an improved brightness image forming screen for optical systems projecting an image rearwardly upon a viewing screen which screen has a vastly brighter image uniformly over the image screen than heretofore obtainable with such screens.

It is another object of the present invention to provide an increase in the amount of light passing through and directed rearwardly through an image forming screen for optical systems projecting an image rearwardly upon a viewing screen while providing uniform illumination over the imager screen.

It is a further object of the present invention to provide a ground glass image forming screen with a surface leveling coating to increase the brightness of the screen, and mounting the coated side of the screen in contact with a Fresnel lens, the combination providing a uniform highly illuminated image directly behind the screen.

It is a still further object of the present invention to provide an image forming screen for cameras having such screens positioned intermediate a viewing lens and a photographer, the screen having a ground glass image forming surface coated with a surface leveling material that increases the brightness of the screen, mounting the coated side of the screen in contact with a Fresnel lens, and positioning an adjustable high magnification factor lens system behind the ground glass screen remote from the Fresnel in a darkend chamber for maximum visible contrast and acuity at the eye of the photographer.

It is a yet further object of the present invention to coat a ground glass image forming screen with a clear epoxy coating of approximately 0.0001 inch thickness, the epoxy having an index of refraction between about 1.55 to 1.65 and a high transmission of light in the visible spectrum to increase the brightness and specularity of the screen substantially, and mounting the coated side of the screen in contact with a Fresnel lens, the combination providing a uniformly brightly illuminated image substantially free of hot spots.

It is a yet still further object of the present invention to provide a method of coating on one side of a ground glass image forming screen with a clear, optical grade epoxy coating having a thickness approximately about 0.0001 inch.

BRIEF DESCRIPTION OF THE DRAWINGS

The particular features and advantages of the invention as well as other objects will become apparent from the following description taken in connection with the accompanying drawings, in which.

DESCRIPTION OF THE PREFERRED EMBODIMENT

Figure 1:
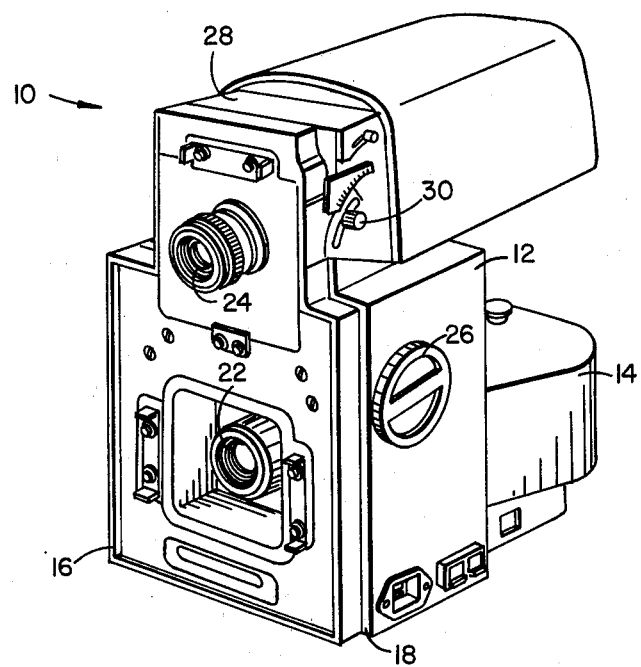
FIG. 1 is a perspective view in somewhat diagrammatic form illustrating the general arrangement of a professional type twin lens reflex camera incorporating a viewing screen system constructed in accordance with the principles of the present invention.
Figure 2:
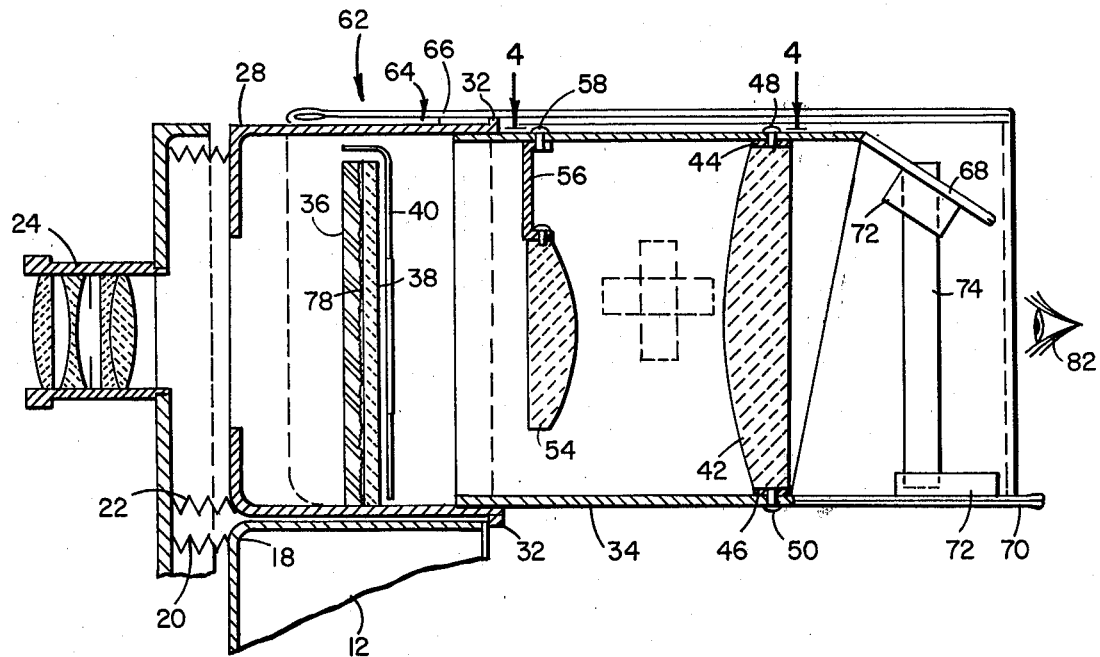
FIG. 2 is a side vertical sectional view in diagrammatic form of the viewing section of the camera illustrated in FIG. 1.
Figure 3:
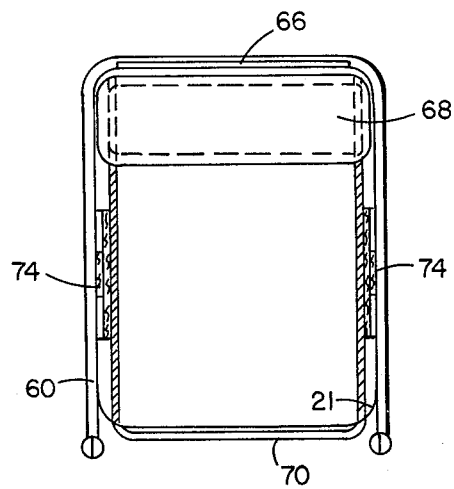
FIG. 3 is an end elevational view of the viewing portion of the camera as seen from the viewing end of FIG. 2.
Figure 4:
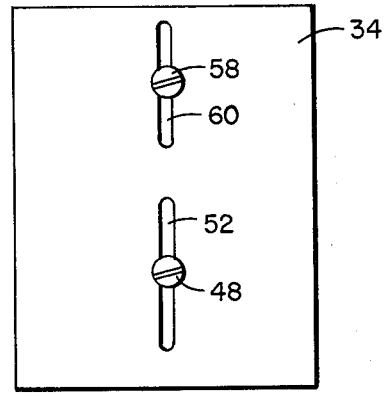
FIG. 4 is a cross sectional view taken substantially along line 4—4 of FIG. 2.

Although the invention is applicable to any optical system incorporating an image forming screen positioned behind and receiving an image through a lens, the invention and the preferred embodiment is illustrated as incorporated within a long roll twin lens reflex camera generally designated at 10. Typically the camera includes a main housing 12 to the bottom rear portion of which a long roll film motorized magazine 14 is connected. Adjustably connected to the front of the housing 12 is a front body member 16, the connection including an internal pair of rigid racks (not illustrated), and the gap 18 between the main housing and the front body member being closed by a light tight bellows 20. Disposed within a lower portion of the front body member 16 is a picture taking lens 22 in alignment with the magazine 14, and a viewing lens 24 is positioned above the lens 22 in the upper portion of the front body member. An adjustment knob 26 located on a side of the main housing 12 is connected internally to a pinion gear to engage the rack and move the front member 16 relatively to the main housing 12. An upper viewing housing 28 is disposed above the main housing 12 and behind the upper lens carrying portion of the front housing and carries the viewing system as hereinafter described, a bellows 22 joined to the viewing housing and the upper portion of the front body member 16 adjustably bridges the gap therebetween. Thus, when the knob 26 is turned the photo lens 22 and the viewing lens 24 move relatively to the plane of the film magazine and the viewing housing 28. A parallax cam assembly generally indicated at 30 provides a vertical adjustment of the viewing housing relatively to the front body member 16 as the camera is focused.

Secured to the rear of the viewer housing 28 by conventional spring-type locks 32 or pins received within corresponding slots is an extended viewer assembly 34. The viewer system is mounted within the viewer housing and the extended viewer assembly and includes a Fresnel lens 36 and a white iron-fire annealed ground glass screen 38 at the focal plane behind the viewing lens 24 and within the viewer housing, the details of which are hereinafter described. A conventional mask 40 is disposed rearwardly of and adjacent to the ground glass screen and comprises a conventional metal slide with a central opening conforming to the shape and size of the film magazine aperture to cut off the excess portion of the viewed image so that the image seen in the viewing system conforms substantially to the image received by the film from the photo lens 22. The Fresnel lens, the ground glass screen and the mask may be conventionally adjusted vertically to maintain the view through the mask identical with the image formed by the photo lens.

Adjustably secured within the extended viewer assembly 34 is a main magnification lens 42, which preferably is a high grade plano-convex lens of optical plastic (acrylic) with the edges painted black to prevent external light reflecting from the inside surfaces of the lens from illuminating the cut edges. The lens 42 preferably includes a metal plate 44, 46 glued to the top and bottom edges respectively for receiving respective fasteners 48, 50 extending through slots 52 (only the upper one being illustrated) in the top and bottom walls respectively of the extended viewer assembly, the fasteners being readily secured anywhere in the slots. In this manner the magnification lens 42 may be adjusted relatively to the ground glass screen to give the desired eye relief. If desirable, for instance where the film aperture size is very small or if required by the photographer, a secondary magnification lens 54 may be disposed between the ground glass screen 38 and the primary magnification lens 42. This secondary magnification lens is similar to the primary lens set up in a Radsden arrangement with the convex surfaces facing and is secured to a bracket 56 which may be adjustably secured to the top of the extended viewer assembly 34 by means of a fastener 58 moveable within a longitudinal slot 60. Typically the lens 42 may have a focal length of 3 Diopter and the secondary lens 54 may have a focal length of 7 Diopter. Preferably all the lenses in the optical system may be coated with an anti-reflection coating.

To provide a dark viewing cavity in the rear of the extended viewer assembly 34 the viewing housing 28 and the extended viewer assembly are covered with a soft vinyl hood 62 attached to the viewer housing by strips of cooperating strips of hook and loop material indicated generally at 64, one of the strips being bonded to the outside of the housing and the other of the strips to the inside of the hood 62. The strips are elongated in the direction front to back so the hood can be positioned readily and removed. The hood may be stiffened by means of a resin impregnated non woven fabric 66 inserted between layers of the soft vinyl. A pair of flaps 68, 70 may be glued to the rear of the extended viewer assembly 34 and include strips of loop material 72, which cooperate with corresponding strips of hook material 74 bonded to the inside surfaces of the rear portion of the hood. The two flaps may thus be adjusted in an arc, the flap 68 being illustrated in an inwardly disposed position, to close down the opening at the viewing station to minimize external light thereby to prevent reflections and accommodate to the eye level of the photographer.

Figure 7:
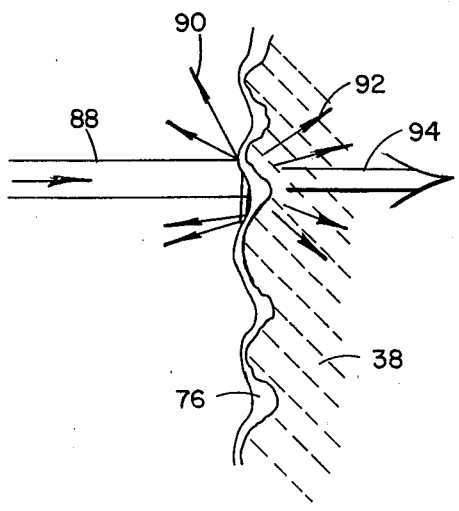
FIG. 7 is a schematic representation similar to FIG. 5 illustrating a coated ground glass screen.

To produce a substantially bright image, the ground glass screen is coated with a void filling or surface leveling thin coating, illustrated schematically in FIG. 7 at 76. The coating is a clear optical grade material and should have an index of refraction between about 1.55 to 1.65 with a very high transmission of visible spectrum light, preferably at least 95%. An epoxy bonding material manufactured by Epoxy Technology, Inc. of Billerica, Ma. and sold under the name EPO-TEK 301-2 has been found to have the requisite properties and has been used successfully. This material is a two part epoxy mixed in the ratio of 100 parts of resin to 35 parts of catalytic hardener and has an index of refraction of about 1.564 with approximately a 98–99% transmission of light in the visible wave length spectrum. The viscosity when mixed is less than 300 cps and has a pot life in excess of a desirable 12 hour minimum. The appropriate layer thickness of approximately 0.0001 inch, the actual range being between 0.00005 inch to 0.0025 inch RMS between the hills and valleys of the glass surface, applied to and cured on the front or image forming surface of the ground glass screen 38 has produced excellent results with a 400 grit ground glass when the surface is in contact with the Fresnel lens 36, a brightness improvement of from approximately 8 to 25 fold with no noticeable hot spots.

Figure 5:
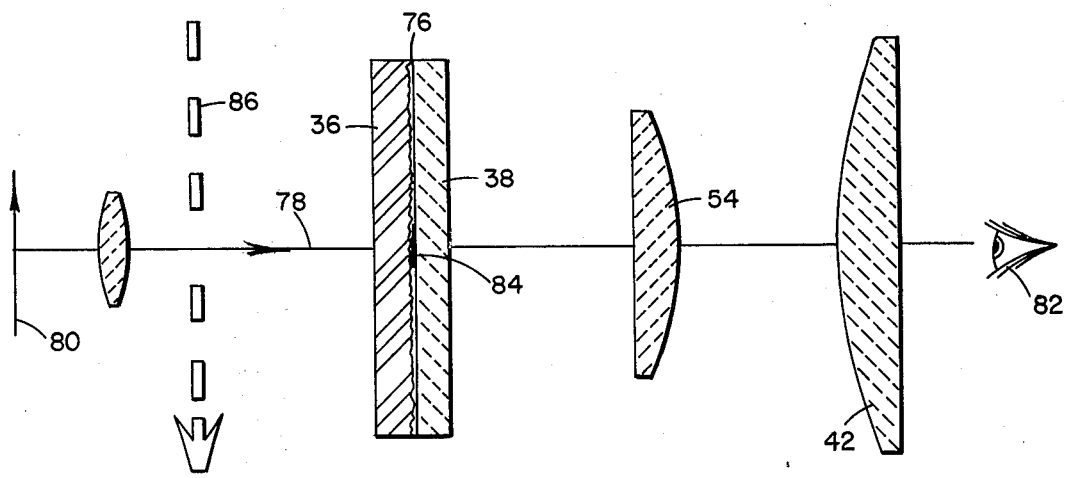
FIG. 5 is a schematic view of the optical elements of the viewer.

As schematically illustrated in FIG. 5 the viewer optical system receives the principal ray 78 from an object 80 and is directed through the assembly of viewer lens 24, focused through the Fresnel lens 36 onto the front surface of the ground glass screen 38. The eye 82 of the photographer then views the real image 84 on the screen 38 through the magnifying lenses 54 and 42 which produce a virtual magnified image at 86 with appropriate eye relief. The Fresnel lens bends the incoming focal rays more nearly normal to the ground glass screen surface to converge the rays toward the center or toward the eye, and eliminates any substantial hot spotting, i.e. a brightly illuminated image in the center of the screen where the light strikes at right angles with darkness about the central spot. The Fresnel lens is an optical grade acrylic having a multiplicity of concentric rings, and is a well known lens in the optical arts.

Figure 6:
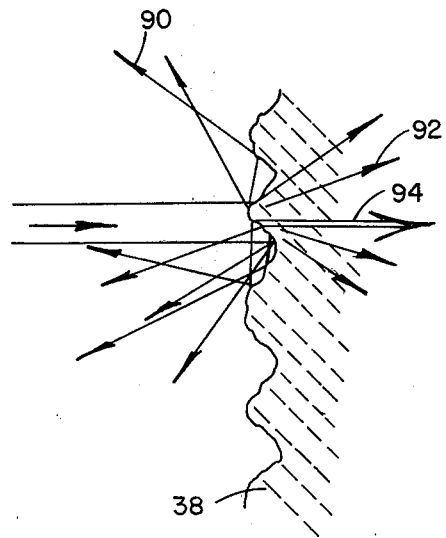
FIG. 6 is a schematic representation of a portion of an uncoated ground glass screen highly magnified for purposes of illustration.

With reference to FIG. 6 a highly mangified portion of the ground glass surface of an uncoated screen 38 is schematically represented with a beam of rays 88 striking the ground fractured surface. As illustrated the rays are scattered in various directions due to reflections and refractions through the multitude of facets and surface cracks in the glass, the reflected rays as illustrated by 90 reflecting forwardly from the surface, and the refracted rays as illustrated at 92 being bent rearwardly out of the line of sight. Thus, only a small portion 94 of the incoming beam of rays 88 passes directly through the screen as viewed by the photographer. However, as illustrated in FIG. 7 when the surface of the screen 38 is coated with the aforesaid coating 76 the effect is drastically different. In this case the reflected rays 90 and the refracted rays 92 are reduced substantially so that a substantial portion of the incoming beam of rays passes directly through as beam 94 to the eye of the photographer. It has been found that the best results are obtained when the screen is a 350–400 grit ground glass. Brightness will improve with a finer ground glass in the range of 600–800 grit, but the angle of viewing is narrowed substantially, while ground glass of coarser grit become granular with a blurry appearance producing little brightness improvement.

To determine the brightness improvement a target is set up in front of a viewer having a screen with half the surface coated and the other half ordinary ground glass. The images are brought together through two identical optical systems and the two images are compared. By adjusting the iris on the brighter lens system it was found that a 150 millimeter lens of f4.5 will stop down to f22.0 before the image equals the brightness of the uncoated side. Using a comparative brightness chart the f4.5 lens has a brightness value of 50 and a f22.0 lens has a brightness value of 2, the relative brightness being 50 divided by 2 or 25 fold brighter. A 105 millimeter f4.5 lens gives a brightness improvement of 8.33 times brighter, the average brightness gained being 12.5 times on coated glass.

To apply the coating to the ground glass screen the glass first should be throughly cleaned and dry. A degreasing material such as detergents, chelating agents and volatile alkaline mixtures are ideal cleansers. After rinsing off with water, a distilled water isopropyl alcohol final rinse may thereafter be applied to remove all traces of salts and cleaning chemicals. The ground glass is then wiped dry and baked for 1 hour at approximately 110° C. to vaporize any absorbed water in the glass which would prevent curing of the epoxy. If the coating is not going to be immediately applied thereafter the glass may be kept in a dessicant environment.

The EPO-TEK 301-2 epoxy compound successfully used as the coating is mixed in the proportion of 100 grams of resin to 35 grams of hardener and dissolved in an aezotropic mixture of water free alcohols and chlorinated hydrocarbon solvents to disolve the compound and dilute it for application to the ground glass screen. An aezotropic mixture of water free isopropyl alcohol and 1,1,1, trichlorethylene in a mixture of 2 ml. of mixed epoxy, 5 ml. of 1.1.1 tce and 13 ml. of isopropyl resulted in a solution that provided good results and that with departures from these proportions the results were undesirable. In this case the epoxy compound was diluted to 10% of the total mix and allowed application of the coating to the glass to the required thickness. The mixture is then uniformly applied to the ground glass side with a smooth transfer wick and after the solvent has evaporated, the epoxy is smoothed and thinned in the manner of flat lens hand polishing with rotating overlapping orbital strokes. After coating and comparison with a standard, the finished part is cured. It has been found that when baked in an oven at 80° C. for 1½ hours excellent results were obtained but good results were also obtained when baked at 75° C. for approximately 2 hours, air curing occuring thereafter. The part may thereafter be coated conventionally with an anti-reflection coating.

The final thickness of the coating is approximately 0.0001 inch, more or less, as determined by experimentally determining the quality of the image of a particular lens on a particular size of ground glass (treated) by removing more or less of the first applied coat and controlling production quality by means of an optical master which is referred to during production and a means of production acceptance of finished cured pieces.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A bright screen optical viewer for an optical device having a viewing lens projecting a received image rearwardly to a viewing station, said viewer comprising, a Fresnel lens disposed intermediate said viewing lens and said viewing station, and a ground glass viewing screen, said screen being coated on one surface with a thin layer of optically clear material having an index of refraction of about 1.55 to 1.65 and at least a 95% transmission of visible spectrum light, and means for mounting said coated surface in abutting contact with said Fresnel lens without integrally uniting said surface and said Fresnel lens intermediate said Fresnel lens and said viewing station.

2. A bright screen viewer as recited in claim 1, wherein the thickness of the coated material is in the range between 0.00005 inch to 0.0025 inch RMS.

3. A bright screen viewer as recited in claim 2, wherein the thickness of the coated material is approximately 0.0001 inch.

4. A bright screen viewer as recited in claim 3, wherein said coated material is an epoxy.

5. A bright screen optical viewer for a twin lens camera, one of said lenses being a viewing lens, said camera including a viewer housing, means for mounting said viewer lens at one end of said housing, a viewing station disposed in optical alignment with said viewer lens defined at an opposite end of the housing from said one end, said viewer comprising, a Fresnel lens disposed intermediate said viewing lens and said viewing station, and a ground glass viewing screen, said screen being coated on one surface with a thin layer of optically clear material having an index of refraction of about 1.55 to 1.65 and at least a 95% transmission of visible spectrum light, and means for mounting said coated surface in abutting contact with said Fresnel lens without uniting said surface and said Fresnel lens intermediate said Fresnel lens and said viewing station.

6. A bright screen viewer as recited in claim 5, wherein the thickness of the coated material is in the range between 0.00005 inch to 0.0025 inch RMS.

7. A bright screen viewer as recited in claim 6, wherein the thickness of the coated material is approximately 0.0001 inch.

8. A bright screen viewer as recited in claim 7, wherein said coated material is an epoxy.

9. A bright screen optical viewer as recited in claim 5 including at least one magnification lens, means for adjustably mounting said magnification lens in said housing between said screen and said viewing station.

10. A bright screen optical viewer as recited in claim 9, wherein two magnification lenses are adjustably mounted in said housing, said magnification lenses each having a planar surface and a convex surface, the convex surface of one facing the convex surface of the other of said magnification lenses.

11. A bright screen optical viewer as recited in claim 9, including a flexible hood positioned about said housing at said viewing station, said hood and said housing having cooperating means for closing a portion of said opposite end of said housing.

12. The method of increasing the brightness of a ground glass optical viewing screen uniformly over the surface of the screen, said method comprising,
coating the surface of the ground glass screen with a thin layer of optically clear material having an index of reraction of about 1.55 to 1.65 and at least a 95% transmission of visible spectrum light, and
mounting the coated screen surface in abutting contact with a Fresnel lens without uniting said surface and said Fresnel lens.

13. The method as recited in claim 12, wherein said coating comprises an epoxy and said step of coating comprises,
cleaning said screen to remove substantially all grease and salts,
baking said screen to evaporize adsorbed moisture from said surface,
dissolving said epoxy in an aezotropic mixture of water free alcohols and chlorinated hydrocarbon solvents to obtain a liquified mixture,
applying said mixture uniformly to said surface and allowing said solvents to evaporate,
smoothing and thinning said epoxy to a thickness of about 0.0001 inch, and
curing said epoxy.

14. The method as recited in claim 13, wherein said epoxy comprises a compound consisting of a resin and a catalytic hardener and said solvents comprise isopropyl alcohol and 1,1,1 trichlorethylene, said liquified mixture comprising 10% of the epoxy compound, 65% of isopropyl alcohol, and 25% of 1,1,1 trichlorethylene.

* * * * *